United States Patent [19]

Malaurie et al.

[11] Patent Number: 5,155,764
[45] Date of Patent: Oct. 13, 1992

[54] TELEPHONE SET WITH ON-HOOK LINE SEIZURE

[75] Inventors: Claude Malaurie, Ermont; André Chataignon, Argenteuil; Pierre Becker, Sannois; Jean-Marc Duvernay, Paris, all of France

[73] Assignee: Alcatel Business Systems, Paris, France

[21] Appl. No.: 552,047

[22] Filed: Jul. 13, 1990

[30] Foreign Application Priority Data

Jul. 18, 1989 [FR] France .................. 89 09616

[51] Int. Cl.⁵ .............................................. H04M 1/00
[52] U.S. Cl. ...................................... 379/377; 379/380; 379/413
[58] Field of Search ............... 379/377, 413, 380, 387, 379/258, 386

[56] References Cited

U.S. PATENT DOCUMENTS

| | | | |
|---|---|---|---|
| 4,506,112 | 3/1985 | Bitsch | 379/377 |
| 4,562,309 | 12/1985 | Le Creff et al. | 379/361 |
| 4,614,843 | 9/1986 | Coulmance | 379/377 X |
| 4,636,587 | 1/1987 | Zoerner | 379/377 |
| 4,809,322 | 2/1989 | Riesmeyer | 379/380 |
| 4,860,346 | 8/1989 | Mellon | 379/413 X |

FOREIGN PATENT DOCUMENTS 2534755 4/1984 France .

OTHER PUBLICATIONS

TN Nachrichten, No. 91, 1987, pp. 3-14; Kramer et al.: "TN-Terminals im neuen Design".
Toute L'Electronique, No. 522, Mar. 1987, pp. 83-86; "Une interface ligne telephonique/modem".

Primary Examiner—James L. Dwyer
Assistant Examiner—M. Shehata
Attorney, Agent, or Firm—Sughrue, Mion, Zinn, Macpeak & Seas

[57] ABSTRACT

A telephone set is provided enabling seizure for originating and terminating calls of a telephone line connected thereto to be performed as well as release thereof, as the result both of a first command produced by a first switching entity actuated from the handset of the telephone set as well as via a second command produced by a second switching entity that is able to be actuated independently of the handset, switching entities producing the commands via individual communication establishment elements which are inserted in parallel in a loop which links, via the controlled power feeding arrangement, the output terminals of a first diode bridge, the input terminals of which are connected to the two line wires via a protection circuit, together with a second diode rectifying bridge, performing actual rectification, linked via capacitors to the output of the protection device, in parallel with the first diode bridge, and adapted to power a microprocessor and relevant circuits of telephone set circuitry, via a second controlled power feeding arrangement, from the alternating current signals transmitted by the line during ringing phases.

8 Claims, 2 Drawing Sheets

TELEPHONE SET WITH ON-HOOK LINE SEIZURE

BACKGROUND OF THE INVENTION

The invention relates to a telephone set that enables the telephone line connected thereto to be seized in calling or answering mode, and released, both by manually lifting the handset off the hookswitch thereof as well as by means of a command produced for example by a fleeting touch of an automatically returned button or by the action of a suitable device, without going off-hook.

More particularly, the invention concerns telephone sets which include at least one circuit requiring an initial determined step to be gone through which requires advance powering prior to being capable of operating, for example a microprocessor-type circuit.

Seizure of a telephone line connected to a telephone set by a user calling from such a set can be conventionally done by the user simply lifting the handset or by the creation of a command as indicated above.

Answering a call terminating at a telephone set, via the line to which the set is connected is achieved in identical fashion by manually going off-hook or by sending a command which can be the above-mentioned seizure command.

In both cases, seizure for an originating or terminating call is expressed in practice by closing a loop made up by the two wires of the line between the telephone set and the remote central office that hosts it; current is then supplied to the set by the line as long as the loop stays closed, allowing the set to be powered, at least partially. In numerous cases, the telephone set is no longer powered when the loop is reopened by manually going on-hook with the handset acting on the hookswitch contacts associated with the set and/or by the action of an on-hook command which can possibly be identical to the seizure command and/or be produced by the same device.

However, some circuits and notably processors fitted into telephone sets for providing a variety of various operating possibilities require imperatively to be powered in order to be set to a determined initial state before being able to be operational.

This is hence a restrictive condition when such a circuit incorporated in a telephone set is only powered by the line to which the set is connected and, consequently, only from the moment where the latter itself is appropriately powered, since, without special arrangements, certain actions performed at set level via, for example, a microprocessor would not be able to be handled as the latter would not be in a position to process them.

The tendency is to however fit such circuits and in particular microprocessors into telephone sets in order to increase operating possibilities to the advantage of users.

SUMMARY OF THE INVENTION

The invention hence provides a telephone set enabling seizure for originating and terminating calls of a telephone line connected thereto to be performed as well as release thereof, as the result both of a first command produced by a first switching entity actuated from the handset of said telephone set as well as via a second command produced by a second switching entity that is able to be actuated independently of the handset, and including a control microprocessor associated with a set of telephone operations electronic circuits, the microprocessor and at least certain ones of said set of electronic circuits being adapted to be able to be powered via two wires of the telephone line, via a diode rectifier bridge and a controlled power feeding arrangement, when these two wires are temporarily interconnected at the telephone set.

In accordance with one characteristic of the invention this telephone set includes switching entities producing said commands via individual communication establishment elements which are inserted in parallel in a loop which links, via the controlled power feeding arrangement, the output terminals of the diode bridge, designated as the first bridge, the input terminals of which are connected to the two line wires via a protection circuit, together with a second diode rectifying bridge, performing actual rectification, linked via capacitors to the output of the protection device, in parallel with the first diode bridge, and adapted to power the microprocessor and the relevant circuits of the set of circuits, via a second controlled power feeding arrangement, from the alternating current signals transmitted by the line during the ringing phases.

DETAILED DESCRIPTION OF A PREFERRED EMBODIMENT

Figure 1:
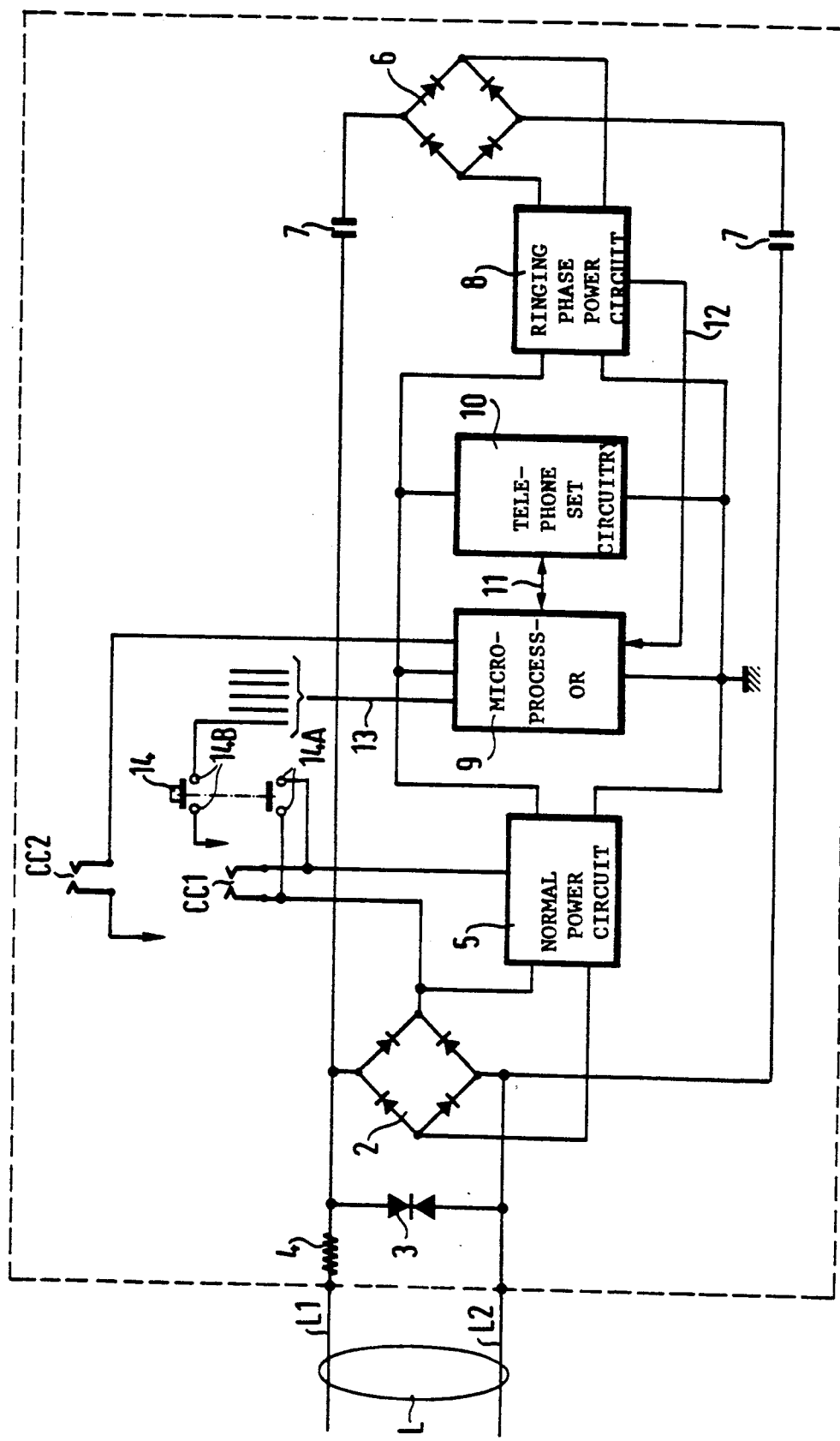
FIG. 1 is a basic circuit diagram of a telephone set in accordance with the invention.

The telephone set 1 shown in FIG. 1 is conventionally designed to be connected to and powered by a central office or switching center, not shown, via at least two wires of a telephone line L. The latter enables telephone signals to be interchanged, notably speech between the set 1, the central office and the other telephone sets with which the set 1 is able to communicate via the central office.

The line L provides direct current power to the set 1 from the central office when the loop established therebetween by line L is closed at the set end 1, for example as a result of closing of a contact CC1 of the hookswitch on which the handset of set 1 rests, when the handset goes off-hook. The line L also sends chopped alternating ringing current signals from the central office when the set 1 is called from another telephone set.

Telephone set 1 is now connected to line L by at least two terminals L1 and L2 which are connected at the input terminals to a rectifier bridge 2, via a protection circuit that here is made up by a thyristor-type transient suppressor device 3 in parallel between the terminal L1 and L2, and a line current limiting resistor 4 in series between the terminal L1 and one of the input terminals.

The bridge 2 is designed to transmit the direct current supplied by the line to a controlled powering circuit 5 of the set to which it is connected by the positive and negative outputs thereof.

A second diode bridge 6 is mounted in parallel with bridge 2 to the input terminals of which it is connected by two capacitors 7. This bridge 6 is designed to rectify the alternating current ringing signals appearing on line L during the ringing phase of set 1 when called by another telephone set, this feeding a second controlled powering circuit 8 of the set to which it is connected by its output terminals.

This makes it possible to power the set 1 with direct current during the phases when the set is being called and where the loop has not yet been closed.

The two controlled powering arrangements 5 and 8 are organized so as to alternately supply the set 1 or, more precisely, the electronic circuits contained therein for example a command microprocessor 9 and the telephone operations electronic circuits of the set functionally grouped together into a unit 10 of one or several circuits, for example here a Motorola TCA 3386 circuit.

The unit 10 incorporates for example an audio function, a duplexing function, a line signaling function, in other words the speech sending and receiving transducers and their possible amplifiers, the hybrid circuit, the pulse dialing or DTMF signaling circuit, etc.

The microprocessor 9 is conventionally linked to the unit 10 by a set of links 11 by means of which it sends commands and receives data for operating the set, in a manner which will not be detailed here since this does not have a direct bearing on the invention.

It is also linked by a link 12 to the second powering circuit 8 so as to be informed of the reception of alternating ringing current signals characteristic of the set 1 being called by another telephone set, and by a link 13 to a control keypad of the set of which only the button 14 is shown here.

Seizure of line L by a user of the set 1 for an originating or terminating call can be achieved by lifting the receiver or handset of the telephone in order to release the hookswitch the first contact CC1 of which then provides, as a result of its closing, closing of the loop linking the set to the host central office, via the wires of line L.

A second contact CC2 here linked to the microprocessor 9 by link 13 informs the latter of the open or closed state of the loop.

Seizure of line L by a user of set 1 can alternatively be achieved by brief depression of an appropriate key or button on the keypad of the set, such as button 14 a first contact 14A of which initiates loop closing in a manner which will be discussed below, and of which a second contact 14B is connected to a data input of microprocessor 9.

Figure 2:
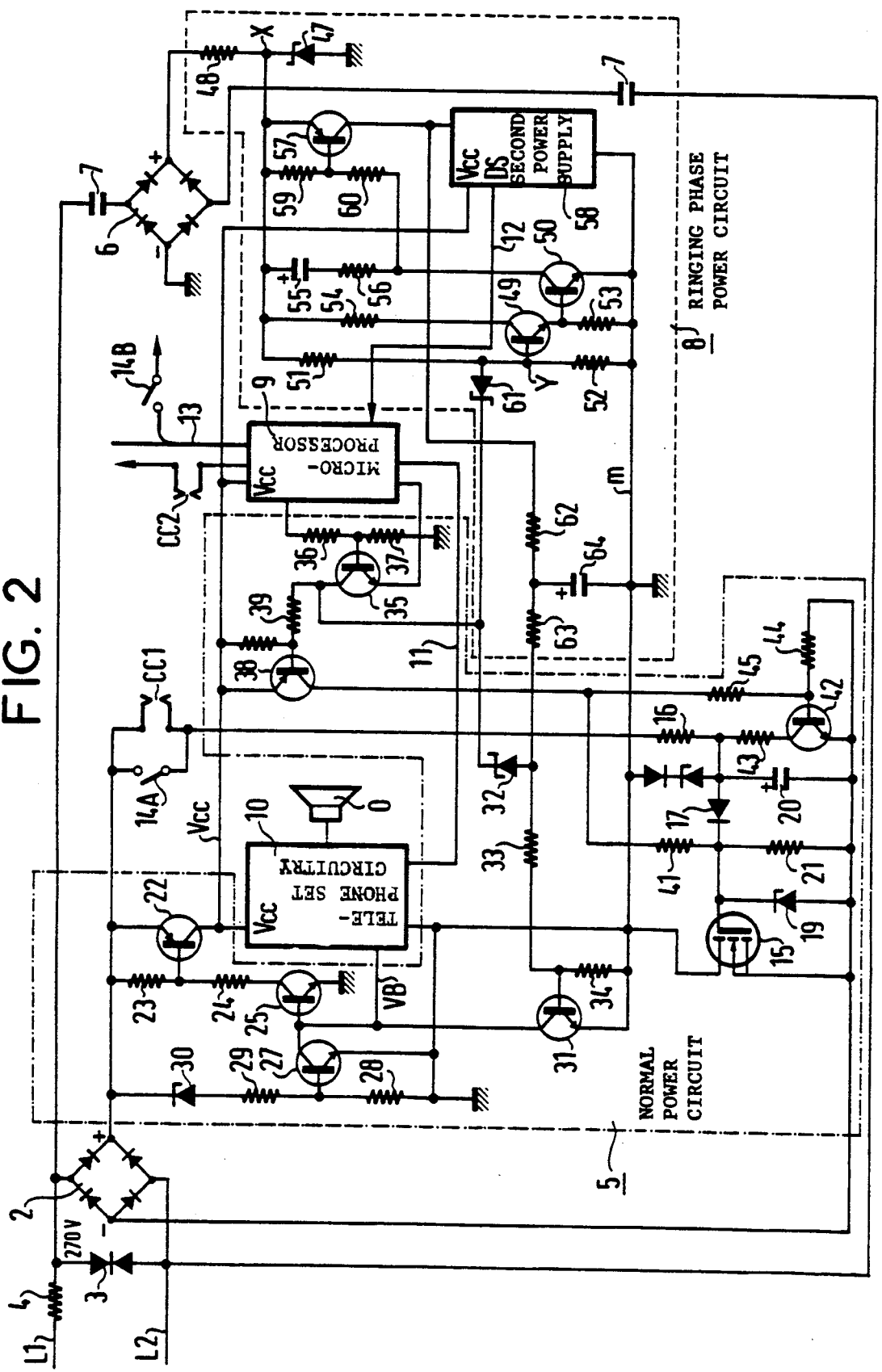
FIG. 2 is a circuit diagram of the arrangement for seizing a line and powering the telephone set from the line according to the invention.

FIG. 2 shows much more detail of the characteristic feature of the invention constituted by the circuit for line seizure and for powering the set, and more specifically, the two controlled powering arrangements 5 and 8.

As indicated in relation with FIG. 1, the powering circuit 5 is connected to the positive and negative terminals at the output of bridge 2 connected to the input terminals L1 and L2 of the set via a protection circuit 3, 4.

A contact 14A, here of the normally-open type of a button 14 of the set keypad and a contact CC1, also of the normally-open type, of the hookswitch of the set are connected to the positive output terminal of the diode bridge in order to provide for application of the positive supply voltage furnished by this bridge to the command electrode of a transistor 15, referred to as the line interrupt transistor and here of the VMOS-type. This transistor 15 has its source connected to the negative output terminal of the said bridge 2 and its drain connected firstly to the negative terminal of the telephone circuit(s) of the unit 10 and, secondly, to the ground of circuit 5; the gate electrode of the line interrupt transistor 15 is connected to the common point of contacts CC1 and 14A via a high value resister 16 and a diode 17 with the cathode thereof connected to said gate electrode.

A Zener diode 19 connected between the gate of transistor 15 and the negative output terminal of said bridge protects this transistor from possible overload greater than for example twelve volts.

A capacitor 20 enables the line interrupt transistor 15 to be kept temporarily conducting, this capacitor being charged as a result of a brief depression of key 14, via contact 14A while the key is kept down and then discharges very slowly via a high value resistor 21 connected to the point that is common to the cathodes of diodes 19 and 17 and to the gate of transistor 15, this capacitor having one of its ends connected between the anode of diode 17 and resistor 16 and the other end connected to the negative output terminal of bridge 2.

The power feed to the unit 10 is also controlled by a transistor 22, referred to as the link setup transistor and here of the PNP type, the emitter of which is connected to the positive output terminal of bridge 2 and the collector being joined to a Vcc power supply line of the telephone set.

The base of transistor 22 is connected to the mid point of a series resistor divider bridge 23, 24, one end of which is connected to the positive output terminal of bridge 2 and the other to the ground of the controlled power feeding circuit 5 via a transistor 25 referred to as the intermediate transistor and here of the NPN type.

The unit 10 acts for example via a current generator on the base of transistor 25, the conducting state of which causes transistor 22 to conduct and the unit 10 to be powered via the Vcc link.

The microprocessor 9 which is connected firstly to the ground of circuit 5 and, secondly, to the collector of transistor 22 like unit 10, is hence also powered by the Vcc link.

A protection circuit including a NPN-type transistor 27 enables the base of transistor 25 to be connected to ground thus blocking transistor 22 in order to protect unit 10 and the microprocessor 9 from a heavy overload voltage at the output terminals of bridge 2.

To achieve this, the base of transistor 27 is biased by resistor divider bridge 28, 29 one end of which is connected to ground while the other end is connected to the positive output terminal of bridge 2, via a Zener diode 30 which reverse conducts for a voltage less than that of the surge protection device 3, for example one hundred and thirty volts instead of two hundred and seventy volts.

Reverse conduction of diode 30 unblocks transistor 27 which short-circuits the base and emitter of transistor 25 which is now blocked.

An NPN type transistor 31 also controls the base of transistor 25 during the alternating ringing current reception phases by the telephone set, the voltage of this ringing current, the maximum value of which is ninety volts, being less than the Zener voltage of diode 30.

This transistor 31 connected by its collector to the base of transistor 25 is connected to ground via its emitter, its base being controlled by the second controlled power feeding circuit 8, via a Schottky diode 32 and a resistor 33, the latter forming a divider bridge with a bias resistor 34 connected between the base thereof and ground, the emitter of transistor 31 also being grounded.

The line interrupt transistor 15 which is adapted to be controlled to close via contacts CC1 and 14A of the set's hookswitch and by button 14, is normally controlled by the microprocessor 9 when it is powered.

To achieve this, the microprocessor 9 controls the base of a NPN type transistor 35 via a resistor divider bridge 36, 37, one end of which is grounded together with one of the two power supply terminals of the microprocessor and the emitter of said transistor, while the other end is connected to the control output of the microprocessor.

The collector of transistor 35 is connected to the base of a PNP type transistor 38 via a resistor 39 in order to control this latter transistor. The said transistor 38 is connected to the collector of transistor 22 firstly by its emitter and, secondly, by its base via a resistor 40 and it is also connected to the base of transistor 15 via a resistor 41. This enables the microprocessor 10 to control the conducting or blocked state of the line interrupt transistor 15 when a line seizure has been performed by means of button 14 or the hook-switch. Conducting of transistor 38 causes an NPN transistor 42 to conduct, which is adapted to provide rapid discharge of capacitor 20 and temporary putting out of circuit of the link via resistor 16 by virtue of the respective values of resistors 16, 21, 41 and 43 involved in this link.

The transistor 42, the emitter of which is connected to the negative output terminal of bridge 2 is, to achieve this effect, connected via its collector to the common point of resistor 16 and the anode of diode 17 via a resistor 43 having a low value compared to the value of resistors 16, 21, 41.

The base of transistor 42 is connected in conventional fashion to its emitter via a resistor 44, and to the collector of transistor 38 which commands it via a resistor 45.

Signalling data to be sent or received during a call by the telephone set via the telephone line are here handled at the level of unit 10, under the supervision of the microprocessor 9 to which it is, for this purpose, connected by the link 11.

When there is a return to the on-hook state initiated by opening of the contacts CC1 and CC2 of the hook-switch or by pressing a button on the set's keypad, which optionally can be button 14, the microprocessor 9 is informed by the one of contacts CC2 or 14B which is open and commands blocking of transistor 35 by software means.

Transistor 35 causes blocking of transistors 38 and 42 and consequently blocking of the line interrupt transistor 15 which breaks the link set up between the positive and negative output terminals of bridge 2 and, consequently, the line loop.

When the relevant telephone set is called by a remote set while the former is not in use, it receives an alternating ringing current signal which is not taken account of by the controlled power feeding circuit 5 for the reasons discussed above, and in particular because of the blocked state of transistors 15 and 22 in the absence of a link set up by one or the other of contacts 14A and CC1.

The second diode bridge 6 is however, powered via the capacitors 7, and if the rectified voltage appearing at its output terminals is less than a limiting value, here of about one hundred and thirty volts fixed by a Zener diode 47, this voltage is applied via a low value current limiting resistor 48 to the input of a Darlington pair composed of two NPN type transistors 49, 50 via a resistor 51 in the second controlled power feeding circuit 8. Two resistors 52 and 53 for biasing the bases of transistors 49 and 50 respectively each connect a base to the ground potential which, via a link m is common to the two controlled power feeding circuits 5 and 8 and to which the emitter of the transistor 50 located further on in the circuit is also connected. A high value resistor 54 connect the collector of transistor 49 to a point X which is common to a resistor 48 and the cathode of a diode 47, while the collector of transistor 50 is connected to this same point via a RC series circuit composed of a capacitor 55 and of an intermediate value resistor 56. Conducting of transistors 49 and 50 in the presence of an alternating ringing current signal ensures conducting of a startup transistor 57 of the PNP type which is inserted ahead of a chopper power supply circuit 58 and between the latter and the common point X.

Transistor 57 has its emitter connected to the point X and its base connected firstly to point X by a resistor 59 and secondly to the collector of transistor 50 by a resistor 60 and provides for the power supply circuit 58 to be brought into circuit between the point X brought to a positive voltage by the second bridge 6 and ground to which this circuit is also connected.

The supply voltage provided by this power supply circuit 58 is applied to the Vcc link and is consequently transmitted to the unit 10 and to the processor 9.

Simultaneously, a ringing call signal DS is supplied by the circuit 58 to an input of microprocessor 9 which commands sending of a ringing signal by the relevant circuit of unit 10 via an aural transducer O.

The collector of transistor 57 also commands transistor 31 of the first controlled power feeding circuit 5 via the resistor 33 and a T-filter composed of two resistors 62 and 63 in series and a capacitor 64 connected between ground and the common point of resistors 62 and 63.

The conducting of transistor 57 during the ringing phase causes transistor 31 to conduct thus leading to transistor 22 becoming blocked, consequently inhibiting powering of the link Vcc by the bridge 2.

The point Y common to resistors 51, 52 and the base of transistor 49 is connected to the collector of the transistor 35 of the first power feeding circuit via Schottky diode 61 enabling the chopped power supply circuit to be blocked as soon as the microprocessor 9 sends a line seizure command to transistor 35 via the resistor 36, the Schottky diode 32 now connecting the output of the T-filter to ground and consequently ensuring isolation of the power supply circuit 58.

In the example provided, substitution of the powering of microprocessor 9 and the unit 10 by the power feeding circuit 5 by powering from the power supply circuit 8 is initiated by the seizure signal which is sent to the microprocessor 9 either from contact CC2 or by contact 14B. In one alternative embodiment, it is possible for this seizure signal to be adapted to be sent by any suitable device, for example a telephone answering machine or a data processing terminal connected to the telephone set provided with the arrangement according to the invention.

What is claimed is:

1. A telephone set enabling seizure for originating and terminating calls of a telephone line connected thereto to be performed as well as release thereof in accordance with both a first command produced by a first switching element actuated from a handset of said telephone set as well as a second command produced by a second switching element which is actuated independently of the handset, said telephone set comprising a control microprocessor and telephone set circuitry, said microprocessor and at least a portion of said telephone set circuitry being adapted to be able to be powered via two wires of the telephone line, via a first diode rectifier bridge and a first controlled power feeding unit, when these two wires are temporarily interconnected at said telephone set, wherein said telephone set includes switching entitles producing the first and second commands via individual communication establishment elements which are connected in parallel in a loop which links, via said first controlled power feeding arrangement, output terminals of said first diode rectifier bridge, input terminals of said first diode rectifier bridge being connected to two wires of the telephone line via a protection circuit, together with a second diode rectifier bridge linked via capacitors to outputs of said protection device, in parallel with said first diode rectifier bridge, for powering said microprocessor and a least the portion of said telephone set circuitry, via a second controlled power feeding unit, from alternating current signals transmitted by the telephone line during ringing phases.

2. A telephone set according to claim 1, wherein the individual communication establishment elements, which are inserted in the loop, control the base of a line interrupt transistor, connected between a negative output terminal of said first diode rectifier bridge and a common ground of said microprocessor and the portion of said telephone set circuitry, for controlling the powering thereof via said first controlled power feeding unit, and which is responsible for loop opening and closing at telephone set level.

3. A telephone set according to claim 2, wherein said second controlled power feeding unit includes a chopped power supply circuit fed from said second diode rectifier bridge when the latter receives an alternating ringing current voltage from the telephone line and which is adapted to power said microprocessor and at least the portion of said telephone set circuitry to which said chopped power supply circuit is connected.

4. A telephone set according to claim 2, wherein said line interrupt transistor controls, via an intermediate transistor, a link setup transistor, inserted between a positive output terminal of said first diode rectifier bridge and a positive power supply lead of said microprocessor and the portion of said telephone set circuitry, said intermediate transistor being controlled in such a fashion as to interrupt the link between the positive output terminal of said first diode rectifier bridge and the positive power supply lead, via one of a protection transistor of a protection circuit responsive to excess voltages at the output of said first diode rectifier bridge and a blocking transistor controlled by said second controlled power feeding unit when the latter is active while receiving alternating ringing current signals transmitted by the telephone line.

5. A telephone set according to claim 3, wherein said second controlled power feeding unit includes a startup transistor which is connected firstly to a positive output terminal of said second diode rectifier bridge and, secondly, to a positively fed terminal of said chopped power supply circuit, said startup transistor being controlled by a command circuit which is responsive to the presence or absence of a rectified voltage at an output of said second diode rectifier bridge corresponding to the transmission of alternating ringing current signals by the telephone line, so as to supply or not supply said chopped power supply circuit with power.

6. A telephone set according to claim 5, wherein said command circuit for said second controlled power feeding unit includes a Darlington pair adapted to control said startup transistor as a function of the rectified voltage present across the output terminals of said second diode rectifier bridge, a voltage corresponding to the rectified voltage being applied to ends of a resistor divider bridge the common point of which is connected to the base of said blocking transistor of said first controlled power feeding unit for inhibiting powering of said microprocessor and at least the portion of said telephone set circuitry by said first controlled power feeding unit when alternating ringing current signals are received from the telephone line by said telephone set.

7. A telephone set according to claim 6, wherein said microprocessor has an output connected to the base of a command transistor that commands said line interrupt transistor to take over control thereof after seizure of the telephone line, said command transistor being itself commanded via a transistor adapted to disconnect said chopped power supply circuit when said microprocessor is powered, said command transistor being itself rendered conducting by the command of said microprocessor, and blocking said Darlington pair by grounding the base of a first transistor of said Darlington pair.

8. A telephone set according to claim 2, wherein said first controlled power feeding unit includes a capacitor between a point common to the individual communication establishment elements and the negative terminal of said first diode rectifier bridge in parallel across a gate-source junction of said line interrupt transistor, said capacitor having a high value resistor associated therewith in parallel, to provide sufficient temporary command of said line interrupt transistor by a short duration signal occasioned by fleeting actuation of the second switching element constituted by an automatic-return contact key, together with a short-circuiting transistor for short-circuiting said capacitor prior to release of the line, the short-circuiting transistor being activated by said microprocessor.

* * * * *